US011870852B1

(12) United States Patent
Henry

(10) Patent No.: US 11,870,852 B1
(45) Date of Patent: Jan. 9, 2024

(54) SYSTEMS AND METHODS FOR LOCAL DATA TRANSMISSION

(71) Applicant: Meta Platforms Technologies, LLC, Menlo Park, CA (US)

(72) Inventor: Colleen Kelly Henry, Oakland, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/194,135

(22) Filed: Mar. 31, 2023

(51) Int. Cl.
*H04L 67/131* (2022.01)
*G02B 27/01* (2006.01)
*H04W 4/80* (2018.01)
*H04L 67/1095* (2022.01)
*H04L 67/06* (2022.01)

(52) U.S. Cl.
CPC .......... *H04L 67/131* (2022.05); *G02B 27/017* (2013.01); *H04L 67/06* (2013.01); *H04L 67/1095* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 7,269,632 B2 * | 9/2007 | Edeker | ................. | H04L 67/131 709/227 |
| 8,683,353 B2 * | 3/2014 | Buhrke | ................. | G06Q 10/10 715/757 |
| 9,616,338 B1 * | 4/2017 | Hooper | ................... | G06F 3/016 |
| 10,433,025 B2 * | 10/2019 | Adamov | .................. | H04L 67/10 |
| 10,558,042 B2 * | 2/2020 | Wieczorek | .............. | G06F 3/167 |
| 10,664,011 B2 * | 5/2020 | Huang | .................... | G06F 1/163 |
| 10,754,496 B2 * | 8/2020 | Kiemele | ............ | G06F 3/04815 |
| 11,069,252 B2 * | 7/2021 | Ghatage | ................... | G09B 5/10 |
| 11,405,774 B2 * | 8/2022 | Amin | ..................... | H04W 8/245 |
| 11,651,561 B2 * | 5/2023 | Daniels | ................. | G06T 19/006 345/633 |
| 2009/0031383 A1 * | 1/2009 | Margaritis | ............. | H04N 7/173 725/116 |
| 2017/0206708 A1 * | 7/2017 | Gentilin | ................ | G06F 1/1632 |
| 2017/0243403 A1 * | 8/2017 | Daniels | ................. | G06F 3/1454 |
| 2018/0150982 A1 * | 5/2018 | Lee | ....................... | H04L 63/123 |
| 2019/0012822 A1 * | 1/2019 | Seigneurbieux | .... | G06F 16/9038 |
| 2020/0064907 A1 * | 2/2020 | Luo | ....................... | A63F 13/211 |
| 2022/0337999 A1 * | 10/2022 | Amin | ..................... | H04W 8/245 |

(Continued)

*Primary Examiner* — Backhean Tiv
(74) *Attorney, Agent, or Firm* — Greenberg Traurig, LLP

(57) ABSTRACT

A computer-implemented method for local data transmission may include determining that data being requested from a remote server by a plurality of artificial reality devices in a shared physical location includes the same data and, in response to determining that the plurality of artificial reality devices are requesting the same data, (i) preventing downloading of the data from the remote server by a set of artificial reality devices within the plurality that excludes a designated artificial reality device, (ii) downloading, by the designated artificial reality device, the data from the remote server, and (iii) transmitting the data from the designated artificial reality device to the set of artificial reality devices via a local data transfer method enabled by the plurality of artificial reality devices being in the shared physical location. Various other methods, systems, and computer-readable media are also disclosed.

20 Claims, 7 Drawing Sheets

(56) References Cited

U.S. PATENT DOCUMENTS

2022/0382051 A1\* 12/2022 Wu .................... G06F 3/0304
2023/0177780 A1\* 6/2023 Tao .................... G06T 19/006
                                                                                     345/633

\* cited by examiner

SYSTEMS AND METHODS FOR LOCAL DATA TRANSMISSION

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
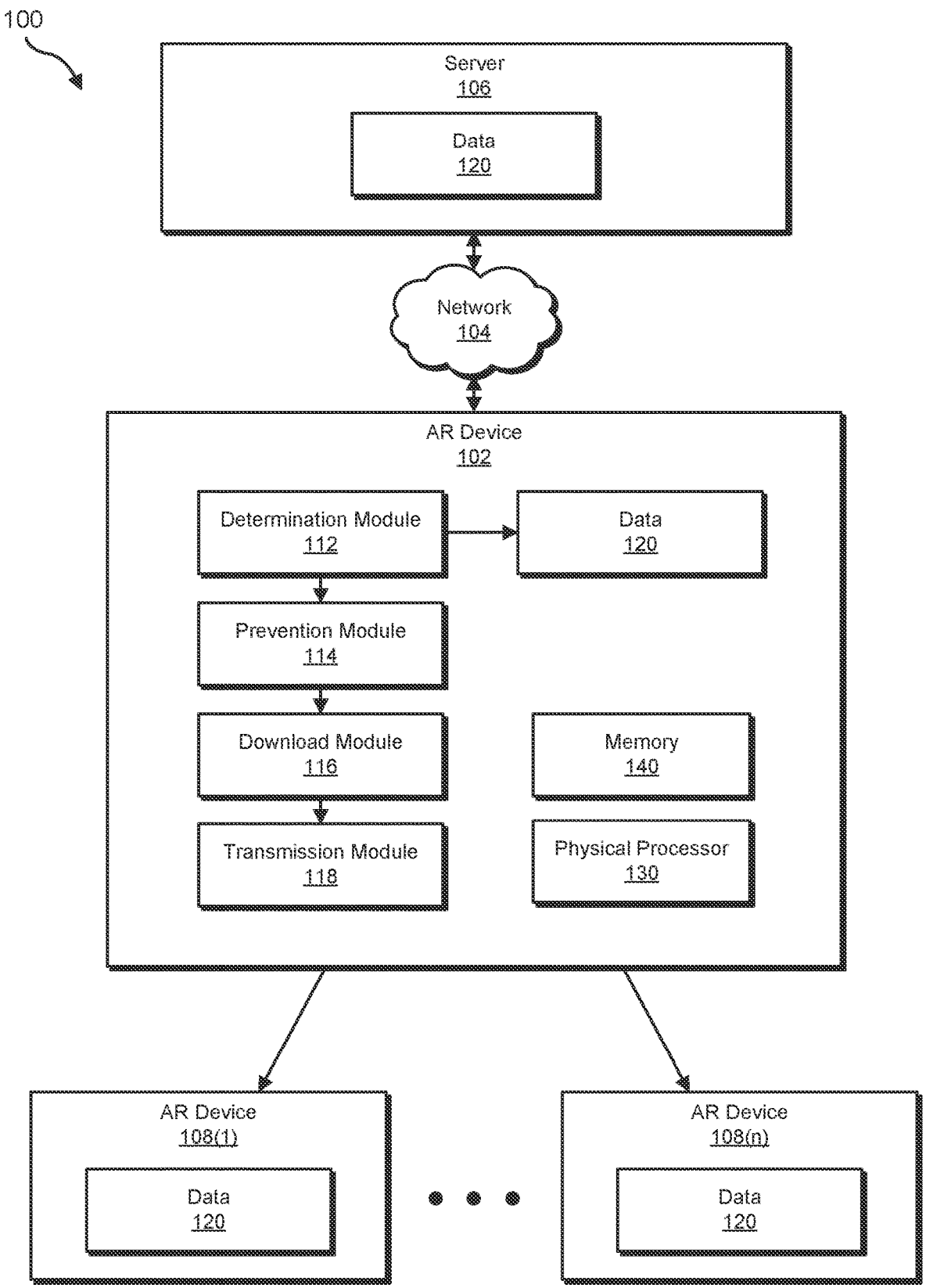
FIG. 1 is a block diagram of an exemplary system for local data transmission.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Features from any of the embodiments described herein may be used in combination with one another in accordance with the general principles described herein. These and other embodiments, features, and advantages will be more fully understood upon reading the following detailed description in conjunction with the accompanying drawings and claims.

DETAILED DESCRIPTION OF EXEMPLARY EMBODIMENTS

When multiple users in the same physical location are engaging in an artificial reality (AR) experience together, it is not efficient to have a separate stream from the cloud to each user's AR device or set of AR devices when the content is the same or similar for each user. This disclosure is generally directed towards systems and methods for identifying and utilizing the most efficient way to transmit data between two or more AR devices in the same physical location. For example, AR headsets in line-of-sight may transmit data via infrared communication, headsets out of line-of-sight but in adjacent areas may transmit data via NFC, while headsets in separate rooms in the same building may transmit data via wi-fi.

In some embodiments, the systems described herein may improve the functioning of a computing device by reducing network bandwidth consumption and/or server resources required to serve content to multiple AR devices in the same physical location. Additionally, the systems described herein may improve the fields of AR experiences by enabling more efficient resource consumption and/or data transfer.

In some embodiments, the systems described herein may receive data from a server via one or more networks (e.g., the Internet). FIG. 1 is a block diagram of an exemplary system 100 for local data transmission. In one embodiment, and as will be described in greater detail below, an AR device 102 may be configured with a determination module that may determine that data 120 being requested from a server 106 by a plurality of AR devices 108(1)-(n) in a shared physical location includes the same data 120. In some embodiments, in response to determining that a plurality of AR devices that includes AR device 102 and AR devices 108(1)-(n) are requesting the same data 120, a prevention module 114 may prevent downloading of data 120 from server 106 by a set of AR devices within the plurality (e.g. AR devices 108(1)-(n)) that excludes a designated AR device (e.g., AR device 102). At about the same time, a download module 116 may download, by AR device 102, data 120 from server 106. Finally, a transmission module 118 may transmit data 120 from AR device 102 to AR devices 108(1)-(n) via a local data transfer method enabled by AR device 102 and AR devices 108(1)-(n) being in the shared physical location.

Server 106 generally represents any type or form of backend computing device that may host AR data. Examples of server 106 may include, without limitation, application servers, database servers, and/or any other relevant type of server. Although illustrated as a single entity in FIG. 1, server 106 may include and/or represent a group of multiple servers that operate in conjunction with one another.

AR device 102 and AR devices 108(1)-(n) generally represent any type or form of computing device capable of presenting an AR environment to a user (e.g., via visual and/or audio outputs). In some examples, AR device 102 may be a head-mounted display. A head-mounted display may be any type of AR device that includes visual and/or audio output elements (e.g., a display screen and/or speakers) and is designed to be worn on a user's head, such as a headset or glasses. In some embodiments, each device in AR devices 108(1)-(n) may be worn and/or operated by a different user, such as a collection of headsets each worn by a different user (as opposed to, e.g., a headset and a handheld controller both operated by the same user). In one embodiment, each device in AR devices 108(1)-(n) may be capable of downloading data 120 from server 106 independently. Although illustrated differently, in some embodiments, AR device 102 and AR devices 108(1)-(n) may be the same type of AR device (e.g., headsets) with the same capabilities. Additionally or alternatively, AR device 102 and/or AR devices 108(1)-(n) may represent a collection of AR devices of different types (e.g., headsets, glasses, personal computing devices such as laptops displaying AR data, smart televisions, etc.). Additional details of example AR devices will be provided in connection with FIGS. 6 and 7, below.

Data 120 generally represents any type or form of AR data. In some embodiments, data 120 may include AR environment data. The term AR environment generally refers to any type of three-dimensional AR space configured to be displayed on an AR device. AR environment data may generally refer to any data that facilitates the display of an AR environment. In some examples, data 120 may be data for an AR game. Additionally or alternatively, data 120 may include data that is originally from a non-AR source but is configured to be displayed in an AR environment, such as music to be played within an AR environment or a rectilinear movie to be played on a virtual television. In some examples, data 120 may include data for AR devices that isn't directly provided as part of an AR environment, such as applications, software updates, firmware updates, etc. For example, data 120 may be a patch for an AR game.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of the modules illustrated in FIG. 1. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of the modules stored in memory 140. Additionally or alternatively, physical processor 130 may execute one or more of the modules. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Figure 2:
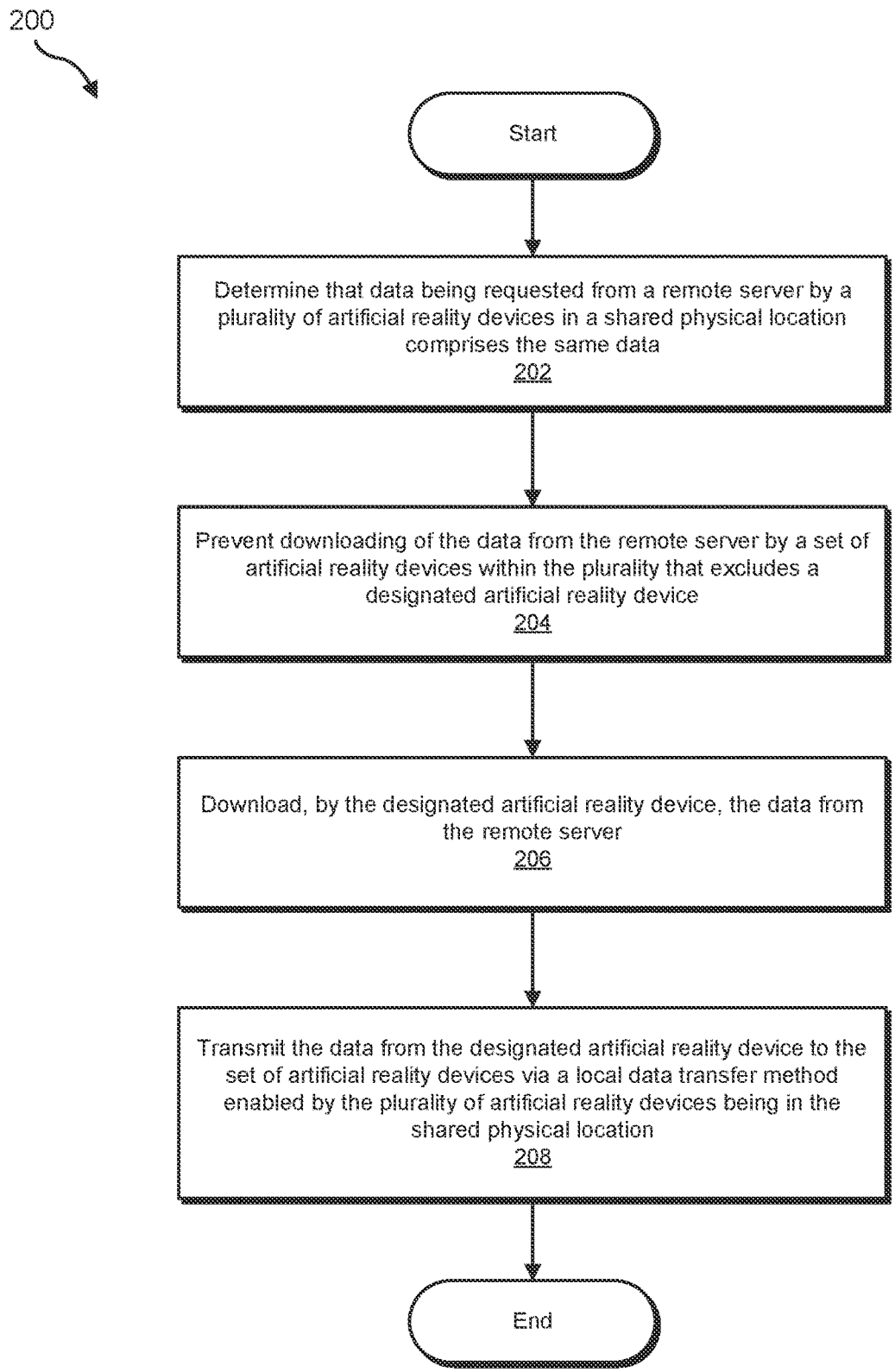
FIG. 2 is a flow diagram of an exemplary method for local data transmission.

FIG. 2 is a flow diagram of an exemplary method 200 for local data transmission. In some examples, at step 202, the systems described herein may determine that data being requested from a remote server by a plurality of AR devices in a shared physical location is the same data.

The term physical location generally refers to any discrete physical area. For example, a physical location may be a building such as a home, office, or AR café. In another example, a physical location may be an outdoor area such as a backyard. In some embodiments, the systems described herein may determine that two or more devices are located in the same physical location if the devices are connected to the same local area network (LAN), are in personal area network (PAN) range, are in a specified radius of one another (e.g., 10 feet, 30 feet, etc.), are geolocated at the same street address, and/or are in line of sight of one another. If two or more devices are in a shared physical location, the devices are occupying the same physical location (e.g., building, outdoor area, specified radius, etc.). By contrast, a remote server may be a server that is not located within the shared physical location. For example, a remote server may be located in another building, city, or even country.

The phrase "the same data" may refer to identical data with the same or different metadata. For example, if two devices are both requesting data describing a specific volumetric object, that data may be the same data. In another example, if two devices are downloading the same movie file from a server, that may be the same data. Additionally or alternatively, the phrase "the same data" may refer to substantially similar data (e.g., data that is 90%, 95%, or 99% identical). For example, if two AR devices are both requesting data describing an AR environment that includes multiple objects, one object which is to be displayed on the first AR device but not the second AR device, the data describing the AR environment may be the same data. In this example, the systems described herein may download the data describing the AR environment to both AR devices and the second AR device may not display the object despite downloading the data that describes the object. In another embodiment, the systems described herein may download the data describing the AR environment except for the data describing the object to both devices and the first AR device may separately download the data describing the object. In some embodiments, the designated AR device may download data that is not currently being requested by any or all AR devices but that is predicted to be requested shortly and may cache this data. For example, if an AR game is displaying a treasure chest object that has multiple treasure items inside, the designated AR device may preemptively download the treasure items even if those items are not yet being displayed on any AR device. In another example, if two avatars within an AR environment are facing different directions and thus causing their respective AR devices to display different sets of objects within the AR environment, the designated AR device may download both sets of objects, facilitating rapid loading of each set of AR objects in the likely event that either avatar turns to face the direction of the objects.

The systems described herein may determine that the data is the same data in a variety of ways and/or contexts. In one example, the systems described herein may determine that each AR device is providing the same AR environment and therefore requesting the same data (i.e., the data for the AR environment). For example, the systems described herein may determine that each AR device is running an instance of the same multiplayer AR game. Additionally or alternatively, the systems described herein may determine that each AR device is requesting the same file (e.g., a software patch).

At step 204, the systems described herein may prevent downloading of the data from the remote server by a set of AR devices within the plurality that excludes a designated AR device. The systems described herein may prevent redundant data download in a variety of ways. In some examples, the set of AR devices within the plurality may be all of the AR devices that are requesting the data except the designated device. For example, if five AR devices are requesting the same data, the systems described herein may designate one AR device to download the data and the other four AR devices as the set of devices that will be prevented from downloading the data directly from the remote server. In one embodiment, the systems described herein may send a message to the set of AR devices instructing the set of AR devices to avoid making data requests to the remote server. In some embodiments, the systems described herein may intercept requests for data to the remote server and redirect these requests to a local device that is downloading the data. In one embodiment, the systems described herein may preempt requests for data by transmitting the data to the set of AR devices.

At step 206, the systems described herein may download, by the designated AR device, the data from the remote server. The systems described herein may download the data in a variety of ways. For example, the systems described herein may send a request for the data via any type of generic or AR-specific data transfer protocol and may receive the data in response. In some examples, the systems described herein may receive a stream of data rather than a single download.

The phrase "designated AR device" or "designated device" may generally refer to any AR device designated by the systems described herein to download data from a remote server and transmit that data to other local devices.

The systems described herein may determine which device is the designated device in a variety of ways. In one embodiment, the systems described herein may evaluate the connection strength of each AR device to the remote server (e.g., the strength of the wi-fi connection between the AR device and a router, the available bandwidth between the AR device and the router, the type of data transfer hardware on the AR device, etc.) and may designate the device with the strongest connection as the designated device. Additionally or alternatively, the systems described herein may evaluate connections of various types (e.g., LAN, PAN, etc.) between the AR devices and may designate the AR device with the overall strongest connections to the most other AR devices as the designated device. In some embodiments, the systems described herein may use a combination of connection strength to the remote server, connection strength to other relevant AR devices, available computing resources on the AR device (e.g., memory, processing power, thermal load, battery life, etc.), and/or other factors (e.g., historical behavior of the current user of the device) to determine which device to designate as the designated download device.

At step 208, the systems described herein may transmit the data from the designated AR device to the set of AR devices via a local data transfer method enabled by the plurality of AR devices being in the shared physical location. The term local data transfer method may describe any type of technology and/or process that enables two or more devices in a shared physical location to transfer data between one another but does not function outside of a shared physical location. For example, a local data transfer method may be a PAN method that uses ultra-high frequency radio waves, which enables two devices in proximity to communicate but does not function over long distances because of the attenuation of the radio waves. Other examples of local data transfer methods may include, without limitation, wi-fi over a LAN, direct wireless data transfer, audio-based data transfer, and/or light-based data transfer.

Figure 3:
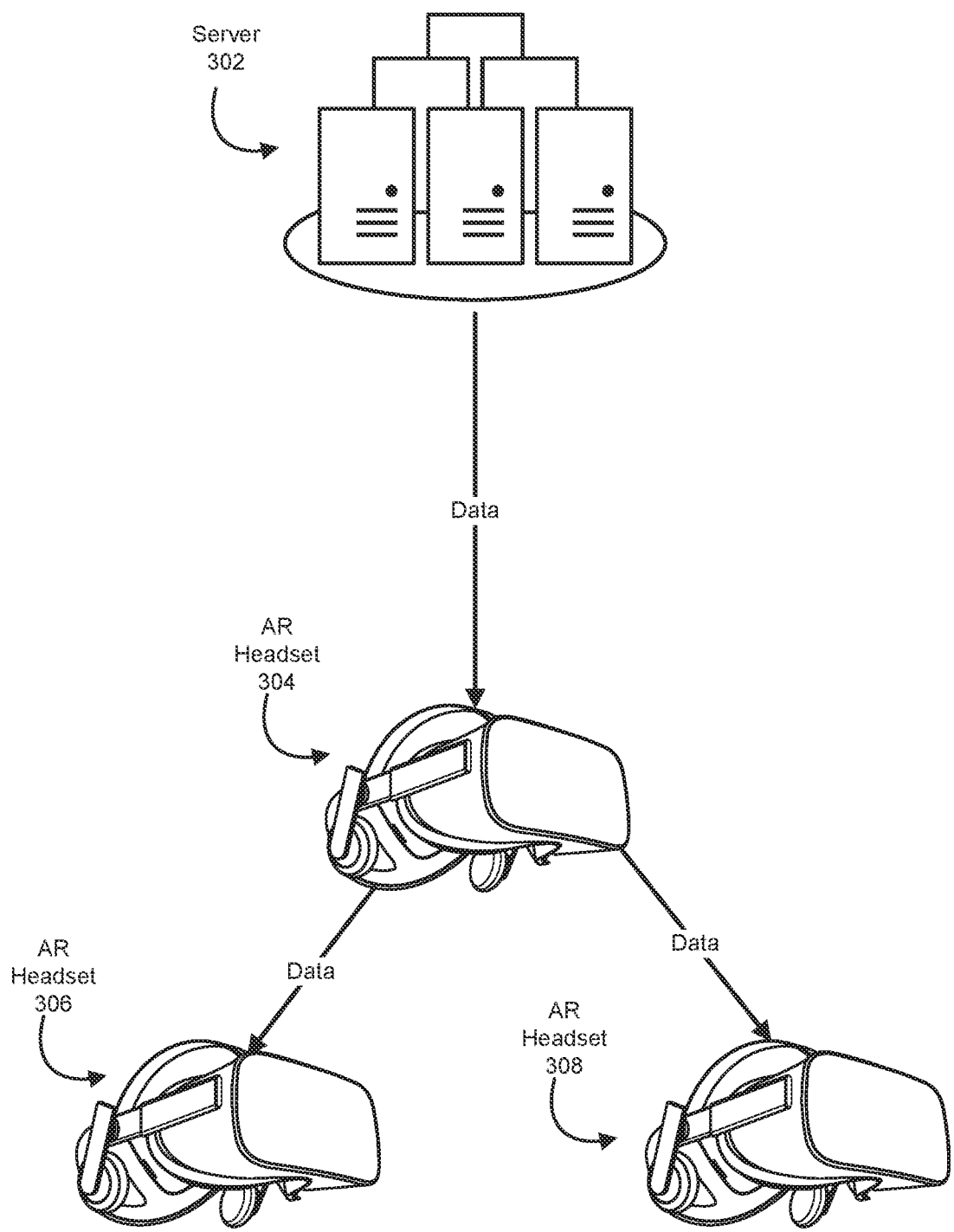
FIG. 3 is an illustration of an exemplary set of artificial reality devices transferring data locally.

In some examples, one AR headset may download the data and transmit it to other AR headsets in the same physical location via one or more local data transfer methods. For example, as illustrated in FIG. 3, an AR headset 304 may download data from a server 302. In this example, AR headset 304 may transmit the downloaded data to AR headsets 306 and/or 308. In some examples, AR headset 304 may download and transmit the data simultaneously, such as when streaming a download from server 302 and relaying the streamed data to AR headsets 306 and/or 308. Alternatively, AR headset 304 may download the data and, upon the completion of the download, transmit the data to AR headsets 306 and/or 308. For example, AR headset 304 may download a firmware update from server 302 and, after downloading the complete firmware update, transmit the firmware update to AR headsets 306 and/or 308.

Figure 4:
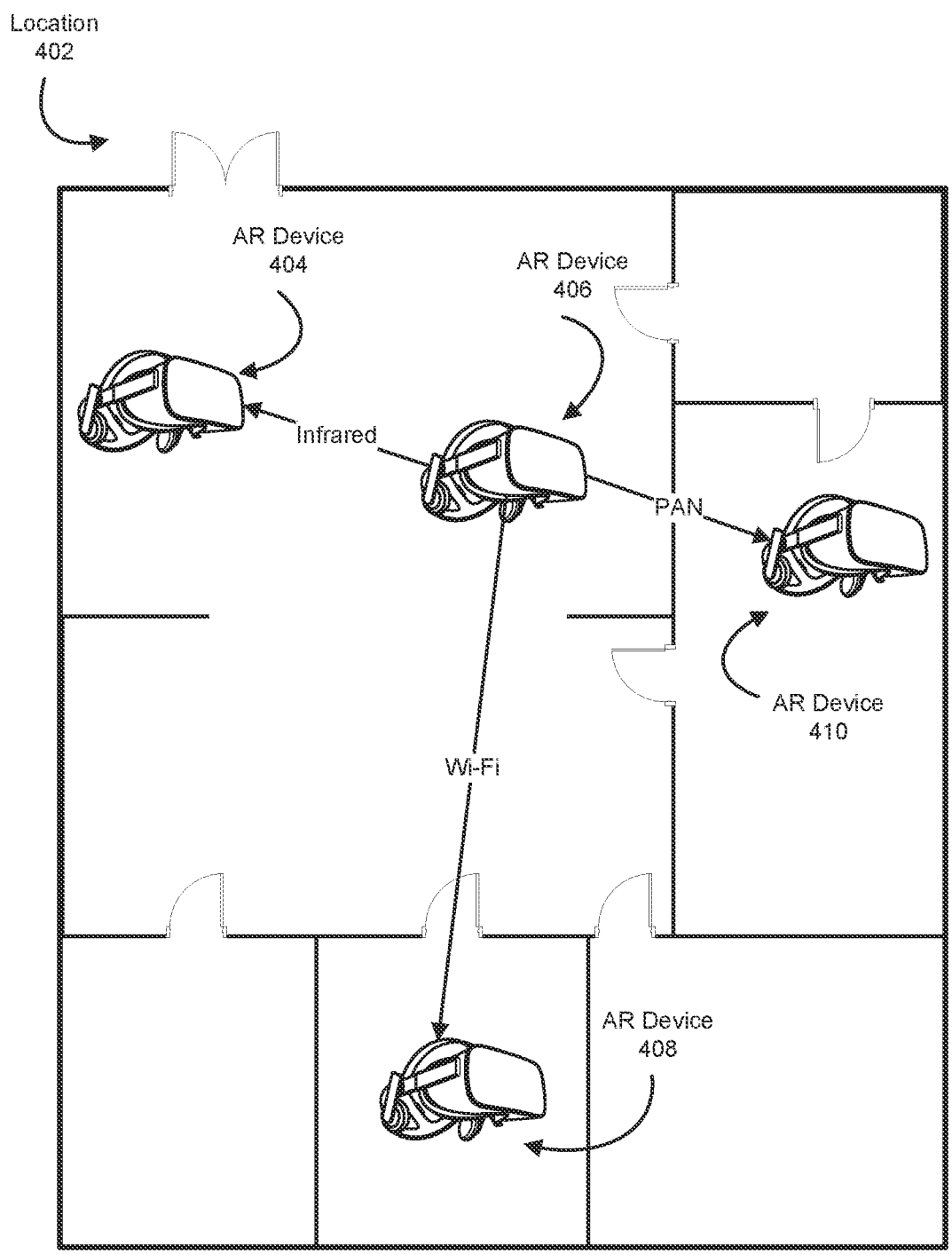
FIG. 4 is an illustration of an exemplary set of artificial reality devices in a shared physical location.

In some embodiments, the designated AR device may select the local data transfer method from a set of available local data transfer methods based at least in part on the position of the designated AR device relative to a position of each other relevant AR device. The term position may generally refer to how an AR device is placed in a physical location relative to other AR devices and/or other types of devices. For example, an AR device in the same room as another AR device may have a different relative position to that AR device than to an AR device located in a different room of the house. In some examples, selecting the local data transfer method may include selecting different methods for different devices with different relative positions to the designated device. For example, as illustrated in FIG. 4, AR devices 404, 406, 408, and/or 410 may share a location 402 such as a house. In one example, AR device 406 may be the designated AR device to download the data from a remote server and transmit that data to other local AR devices.

In some examples, AR device 406 may determine that AR device 404 is within line of sight and, based on this determination, may transmit the data to AR device 404 via a light-based data transfer method. The term light-based data transfer method may generally refer to any data transfer method that primarily relies on a part of the light spectrum, whether visible or not, to transmit data between two or more devices. For example, AR device 406 may transmit the data to AR device 404 via a series of infrared pulses. By contrast, AR device 410 may not be within line of sight of AR device 406. However, AR device 410 may be within sufficiently close physical proximity for PAN data transfer and, in response to determining that AR device 410 is in PAN range, AR device 406 may transmit the data via PAN. In one example, AR device 408 may be in a different room across the house and thus may not be eligible for light-based or PAN data transmission from AR device 406. In this example, AR device 406 may transmit data to AR device 408 via a wi-fi data transfer over a LAN or directly.

Figure 5:
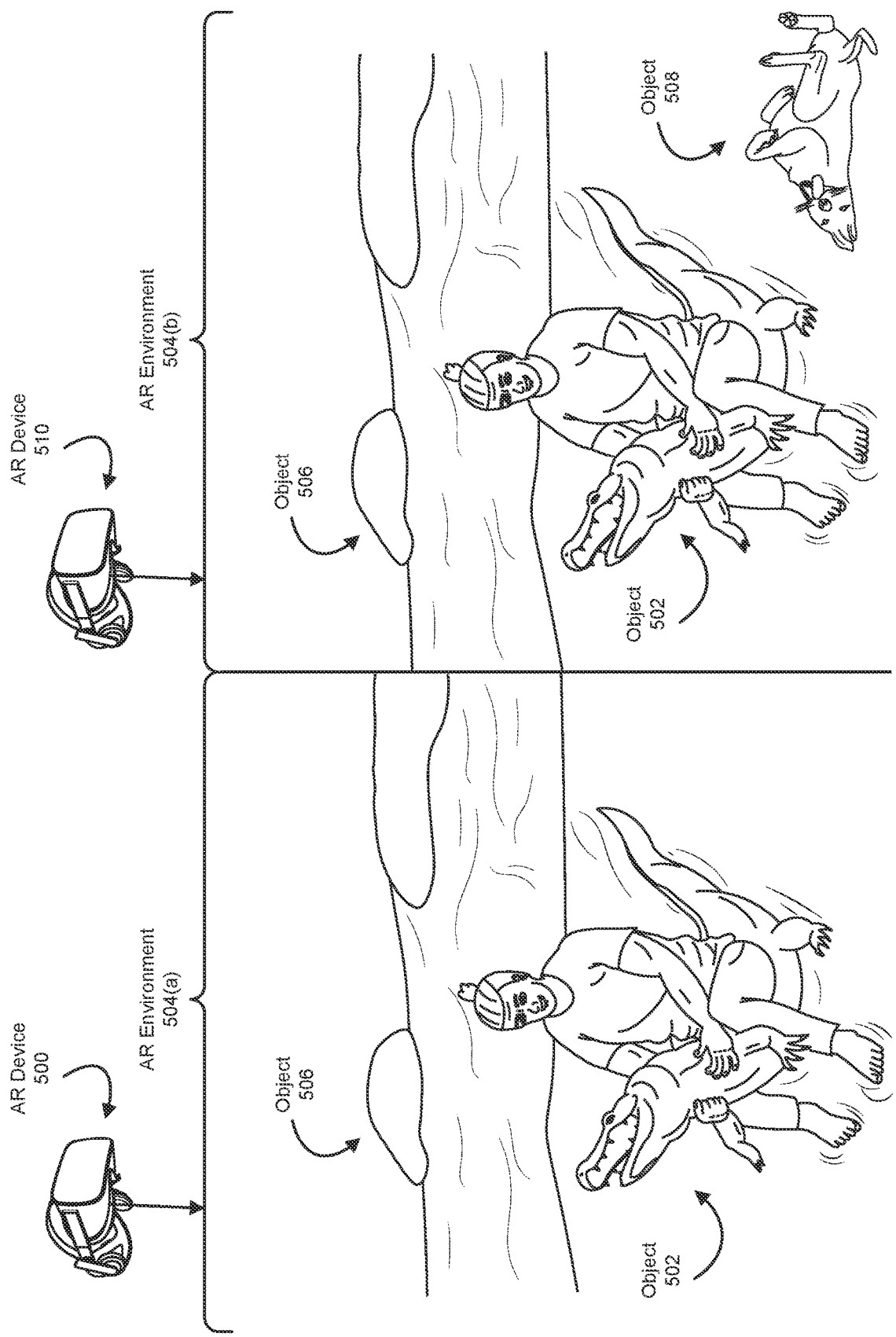
FIG. 5 is an illustration of an exemplary artificial reality environment.

In some embodiments, different AR devices may request and/or display overlapping but not identical sets of AR data. For example, as illustrated in FIG. 5, an AR device 500 may provide an instance of an AR environment 504(a) for an alligator wrestling game while an AR device 510 may provide an instance of AR environment 504(b) for a shared session of the same alligator wrestling game. In one example, AR environment 504(a) and AR environment 504(b) may include an environmental object 506 such as a boulder and/or a dynamic object 502 such as an alligator wrestler, but AR environment 504(b) may include an object 508 such as exclusive virtual pet registered to the operator of AR device 510 while AR environment 504(a) may not include or display object 508. In one embodiment, the designated AR device may download data for objects 502, 506, and 508 and AR device 500 may receive the data for object 508 but may not display object 508. In another embodiment, the designated AR device may download data for objects 502 and 506 while AR device 510 separately downloads the data for object 508.

As described above, the systems and methods described herein may improve the efficiency of downloading AR data within a location by designating a specific device to download the data for all relevant local devices rather than allowing all relevant local devices to make redundant data requests of a remote server that hosts the day. By using different local data transmission methods based on the relative positions of devices within the location, the systems described herein may further improve the efficiency of the data transmission by minimizing the usage of network and/or computing resources. In this way, the systems described herein may conserve significant amounts of network bandwidth and/or other computing resources while downloading AR data to multiple devices in a shared physical location.

Embodiments of the present disclosure may include or be implemented in conjunction with various types of artificial reality, virtual reality, and/or augmented reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs). Other artificial reality systems may include an NED that also provides visibility into the real world (such as, e.g., augmented-reality system 600 in FIG. 6) or that visually immerses a user in an artificial reality (such as, e.g., virtual-reality system 700 in FIG. 7). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 6:
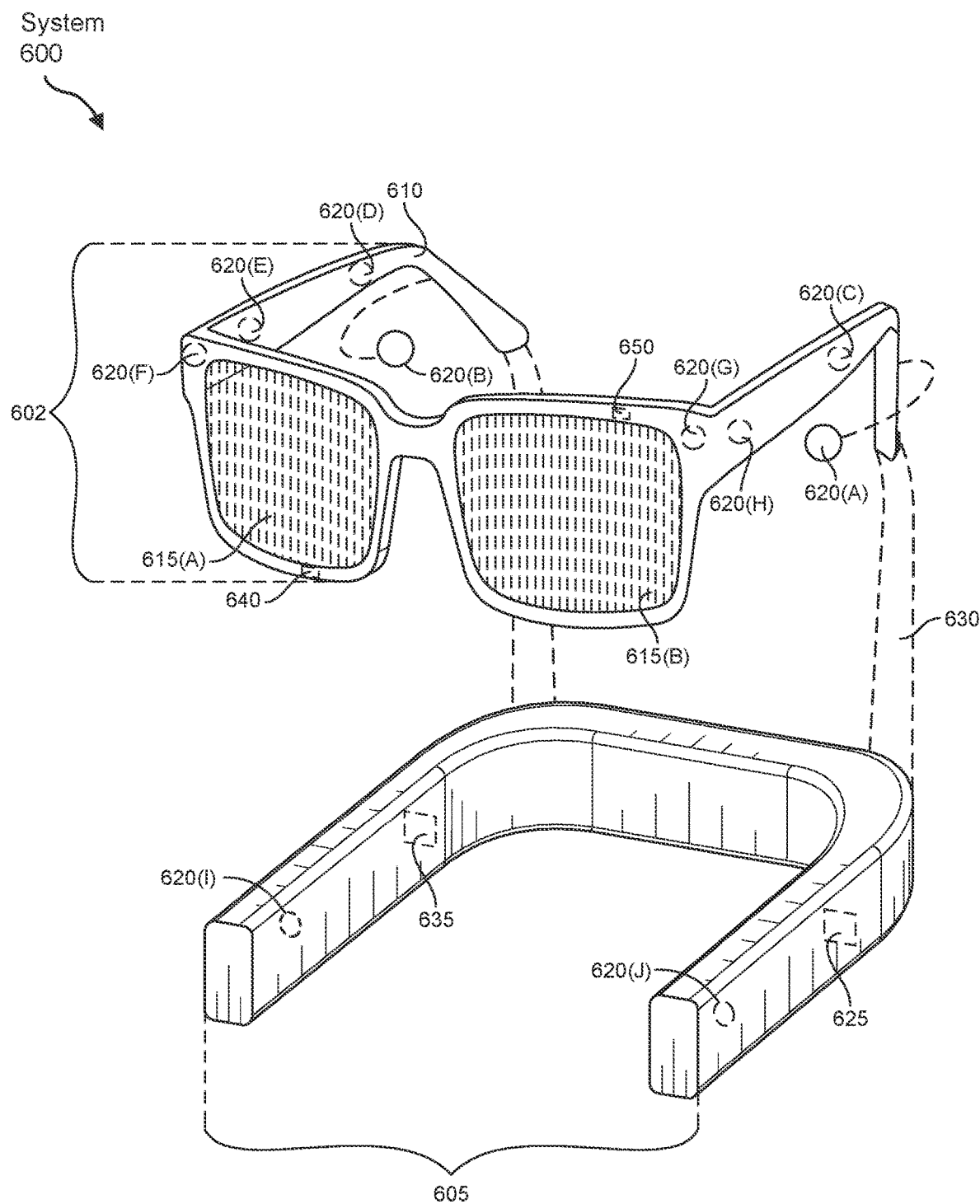
FIG. 6 is an illustration of exemplary augmented-reality glasses that may be used in connection with embodiments of this disclosure.
Figure 7:
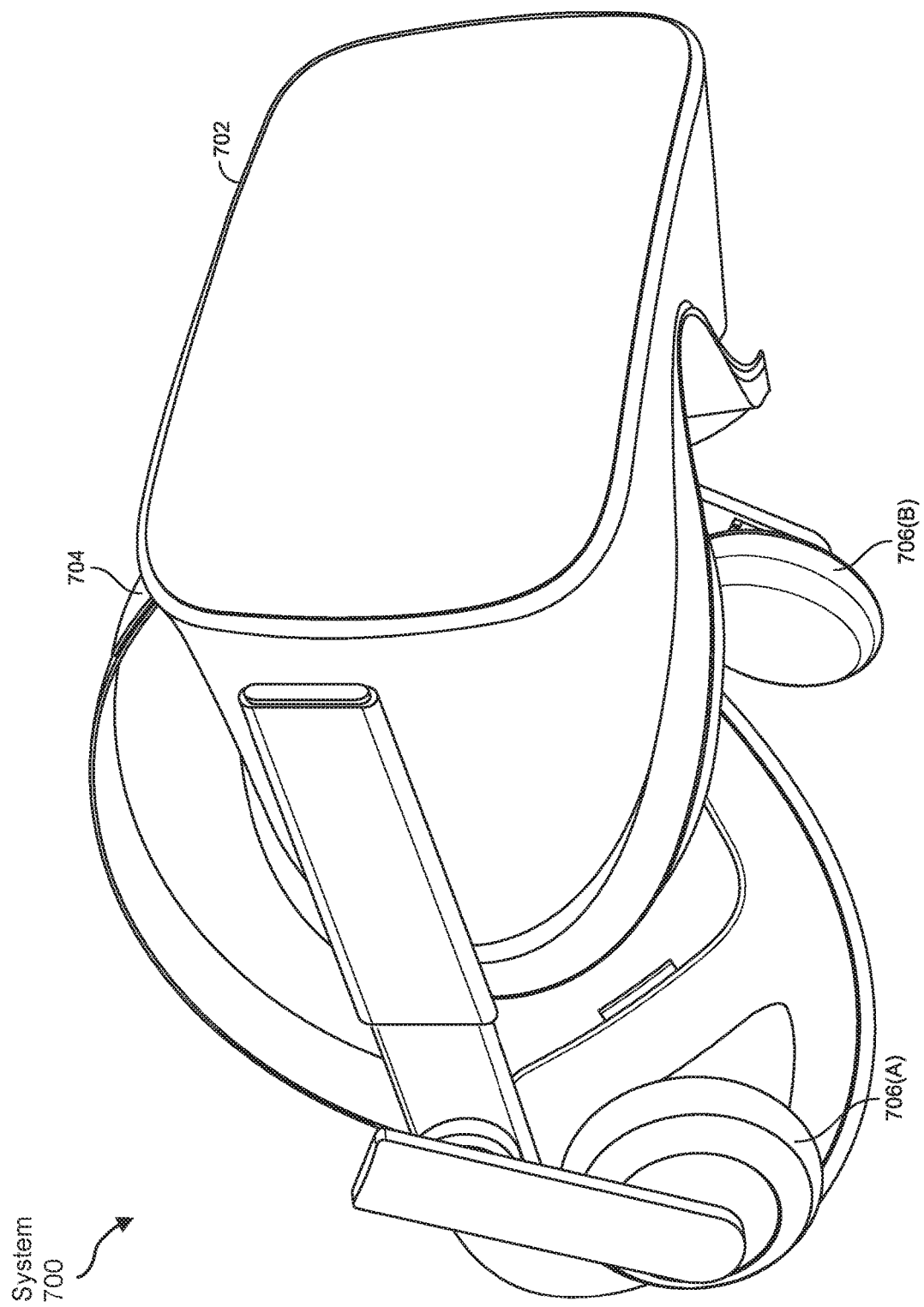
FIG. 7 is an illustration of an exemplary virtual-reality headset that may be used in connection with embodiments of this disclosure.

Turning to FIG. 6, augmented-reality system 600 may include an eyewear device 602 with a frame 610 configured to hold a left display device 615(A) and a right display device 615(B) in front of a user's eyes. Display devices 615(A) and 615(B) may act together or independently to present an image or series of images to a user. While augmented-reality system 600 includes two displays, embodiments of this disclosure may be implemented in augmented-reality systems with a single NED or more than two NEDs.

In some embodiments, augmented-reality system 600 may include one or more sensors, such as sensor 640. Sensor 640 may generate measurement signals in response to motion of augmented-reality system 600 and may be located on substantially any portion of frame 610. Sensor 640 may represent one or more of a variety of different sensing mechanisms, such as a position sensor, an inertial measurement unit (IMU), a depth camera assembly, a structured light emitter and/or detector, or any combination thereof. In some embodiments, augmented-reality system 600 may or may not include sensor 640 or may include more than one sensor. In embodiments in which sensor 640 includes an IMU, the IMU may generate calibration data based on measurement signals from sensor 640. Examples of sensor 640 may include, without limitation, accelerometers, gyroscopes, magnetometers, other suitable types of sensors that detect motion, sensors used for error correction of the IMU, or some combination thereof.

In some examples, augmented-reality system 600 may also include a microphone array with a plurality of acoustic transducers 620(A)-120(J), referred to collectively as acoustic transducers 620. Acoustic transducers 620 may represent transducers that detect air pressure variations induced by sound waves. Each acoustic transducer 620 may be configured to detect sound and convert the detected sound into an electronic format (e.g., an analog or digital format). The microphone array in FIG. 6 may include, for example, ten acoustic transducers: 620(A) and 620(B), which may be designed to be placed inside a corresponding ear of the user, acoustic transducers 620(C), 620(D), 620(E), 620(F), 620(G), and 620(H), which may be positioned at various locations on frame 610, and/or acoustic transducers 620(1) and 620(J), which may be positioned on a corresponding neckband 605.

In some embodiments, one or more of acoustic transducers 620(A)-(J) may be used as output transducers (e.g., speakers). For example, acoustic transducers 620(A) and/or 620(B) may be earbuds or any other suitable type of headphone or speaker.

The configuration of acoustic transducers 620 of the microphone array may vary. While augmented-reality system 600 is shown in FIG. 6 as having ten acoustic transducers 620, the number of acoustic transducers 620 may be greater or less than ten. In some embodiments, using higher numbers of acoustic transducers 620 may increase the amount of audio information collected and/or the sensitivity and accuracy of the audio information. In contrast, using a lower number of acoustic transducers 620 may decrease the computing power required by an associated controller 650 to process the collected audio information. In addition, the position of each acoustic transducer 620 of the microphone array may vary. For example, the position of an acoustic transducer 620 may include a defined position on the user, a defined coordinate on frame 610, an orientation associated with each acoustic transducer 620, or some combination thereof.

Acoustic transducers 620(A) and 620(B) may be positioned on different parts of the user's ear, such as behind the pinna, behind the tragus, and/or within the auricle or fossa. Or, there may be additional acoustic transducers 620 on or surrounding the ear in addition to acoustic transducers 620 inside the ear canal. Having an acoustic transducer 620 positioned next to an ear canal of a user may enable the microphone array to collect information on how sounds arrive at the ear canal. By positioning at least two of acoustic transducers 620 on either side of a user's head (e.g., as binaural microphones), augmented-reality system 600 may simulate binaural hearing and capture a 3D stereo sound field around about a user's head. In some embodiments, acoustic transducers 620(A) and 620(B) may be connected to augmented-reality system 600 via a wired connection 630, and in other embodiments acoustic transducers 620(A) and 620(B) may be connected to augmented-reality system 600 via a wireless connection (e.g., a BLUETOOTH connection). In still other embodiments, acoustic transducers 620(A) and 620(B) may not be used at all in conjunction with augmented-reality system 600.

Acoustic transducers 620 on frame 610 may be positioned in a variety of different ways, including along the length of the temples, across the bridge, above or below display devices 615(A) and 615(B), or some combination thereof. Acoustic transducers 620 may also be oriented such that the microphone array is able to detect sounds in a wide range of directions surrounding the user wearing the augmented-reality system 600. In some embodiments, an optimization process may be performed during manufacturing of augmented-reality system 600 to determine relative positioning of each acoustic transducer 620 in the microphone array.

In some examples, augmented-reality system 600 may include or be connected to an external device (e.g., a paired device), such as neckband 605. Neckband 605 generally represents any type or form of paired device. Thus, the following discussion of neckband 605 may also apply to various other paired devices, such as charging cases, smart watches, smart phones, wrist bands, other wearable devices, hand-held controllers, tablet computers, laptop computers, other external compute devices, etc.

As shown, neckband 605 may be coupled to eyewear device 602 via one or more connectors. The connectors may be wired or wireless and may include electrical and/or non-electrical (e.g., structural) components. In some cases, eyewear device 602 and neckband 605 may operate independently without any wired or wireless connection between them. While FIG. 6 illustrates the components of eyewear device 602 and neckband 605 in example locations on eyewear device 602 and neckband 605, the components may be located elsewhere and/or distributed differently on eyewear device 602 and/or neckband 605. In some embodiments, the components of eyewear device 602 and neckband 605 may be located on one or more additional peripheral devices paired with eyewear device 602, neckband 605, or some combination thereof.

Pairing external devices, such as neckband 605, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 600 may be provided by a paired device or shared between a paired device and an eyewear device, thus reducing the weight, heat profile, and form factor of the eyewear device overall while still retaining desired functionality. For example, neckband 605 may allow components that would otherwise be included on an eyewear device to be included in neckband 605 since users may tolerate a heavier weight load on their shoulders than they would tolerate on their heads. Neckband 605 may also have a larger surface area over which to diffuse and disperse heat to the ambient environment. Thus, neckband 605 may allow for greater battery and computation capacity than might otherwise have been possible on a stand-alone eyewear device. Since weight carried in neckband 605 may be less invasive to a user than weight carried in eyewear device 602, a user may tolerate wearing a lighter eyewear device and carrying or wearing the paired device for greater lengths of time than a user would tolerate wearing a heavy standalone eyewear device, thereby enabling users to more fully incorporate artificial reality environments into their day-to-day activities.

Neckband 605 may be communicatively coupled with eyewear device 602 and/or to other devices. These other devices may provide certain functions (e.g., tracking, localizing, depth mapping, processing, storage, etc.) to augmented-reality system 600. In the embodiment of FIG. 6, neckband 605 may include two acoustic transducers (e.g., 620(I) and 620(J)) that are part of the microphone array (or potentially form their own microphone subarray). Neckband 605 may also include a controller 625 and a power source 635.

Acoustic transducers 620(I) and 620(J) of neckband 605 may be configured to detect sound and convert the detected sound into an electronic format (analog or digital). In the embodiment of FIG. 6, acoustic transducers 620(I) and 620(J) may be positioned on neckband 605, thereby increasing the distance between the neckband acoustic transducers 620(I) and 620(J) and other acoustic transducers 620 positioned on eyewear device 602. In some cases, increasing the distance between acoustic transducers 620 of the microphone array may improve the accuracy of beamforming performed via the microphone array. For example, if a sound is detected by acoustic transducers 620(C) and 620(D) and the distance between acoustic transducers 620(C) and 620(D) is greater than, e.g., the distance between acoustic transducers 620(D) and 620(E), the determined source location of the detected sound may be more accurate than if the sound had been detected by acoustic transducers 620(D) and 620(E).

Controller 625 of neckband 605 may process information generated by the sensors on neckband 605 and/or augmented-reality system 600. For example, controller 625 may process information from the microphone array that describes sounds detected by the microphone array. For each detected sound, controller 625 may perform a direction-of-arrival (DOA) estimation to estimate a direction from which the detected sound arrived at the microphone array. As the microphone array detects sounds, controller 625 may populate an audio data set with the information. In embodiments in which augmented-reality system 600 includes an inertial measurement unit, controller 625 may compute all inertial and spatial calculations from the IMU located on eyewear device 602. A connector may convey information between augmented-reality system 600 and neckband 605 and between augmented-reality system 600 and controller 625. The information may be in the form of optical data, electrical data, wireless data, or any other transmittable data form. Moving the processing of information generated by augmented-reality system 600 to neckband 605 may reduce weight and heat in eyewear device 602, making it more comfortable to the user.

Power source 635 in neckband 605 may provide power to eyewear device 602 and/or to neckband 605. Power source 635 may include, without limitation, lithium-ion batteries, lithium-polymer batteries, primary lithium batteries, alkaline batteries, or any other form of power storage. In some cases, power source 635 may be a wired power source. Including power source 635 on neckband 605 instead of on eyewear device 602 may help better distribute the weight and heat generated by power source 635.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 700 in FIG. 7, that mostly or completely covers a user's field of view. Virtual-reality system 700 may include a front rigid body 702 and a band 704 shaped to fit around a user's head. Virtual-reality system 700 may also include output audio transducers 706(A) and 706(B). Furthermore, while not shown in FIG. 7, front rigid body 702 may include one or more electronic elements, including one or more electronic displays, one or more inertial measurement units (IMUS), one or more tracking emitters or detectors, and/or any other suitable device or system for creating an artificial-reality experience.

Artificial reality systems may include a variety of types of visual feedback mechanisms. For example, display devices in augmented-reality system 600 and/or virtual-reality system 700 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial reality systems may include a single display screen for both eyes or may provide a display screen for each eye, which may allow for additional flexibility for varifocal adjustments or for correcting a user's refractive error. Some of these artificial reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial reality systems described herein may include one or more projection systems. For example, display devices in augmented-reality system 600 and/or virtual-reality system 700 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial reality systems may also be configured with any other suitable type or form of image projection system, such as retinal projectors used in virtual retina displays.

The artificial reality systems described herein may also include various types of computer vision components and subsystems. For example, augmented-reality system 600 and/or virtual-reality system 700 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

The artificial reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial reality experience in one or more of these contexts and environments and/or in other contexts and environments.

EXAMPLE EMBODIMENTS

Example 1: A method for local data transmission may include determining that data being requested from a remote server by a plurality of artificial reality devices in a shared physical location includes the same data and, in response to determining that the plurality of artificial reality devices are requesting the same data, (i) preventing downloading of the data from the remote server by a set of artificial reality devices within the plurality that excludes a designated artificial reality device, (ii) downloading, by the designated artificial reality device, the data from the remote server, and (iii) transmitting the data from the designated artificial reality device to the set of artificial reality devices via a local data transfer method enabled by the plurality of artificial reality devices being in the shared physical location.

Example 2: The computer-implemented method of example 1, where the data includes artificial reality environment data.

Example 3: The computer-implemented method of examples 1-2, where the plurality of artificial reality devices includes a plurality of head-mounted displays.

Example 4: The computer-implemented method of examples 1-3, where transmitting the data from the designated artificial reality device to the set of artificial reality devices includes selecting the local data transfer method from a set of available local data transfer methods based at least in part on a position of the designated artificial reality device relative to a position of each artificial reality device in the set of artificial reality devices.

Example 5: The computer-implemented method of examples 1-4, where selecting the local data transfer method from the set of available local data transfer methods includes selecting a first local data transfer method for a first artificial reality device and a second local data transfer method for a second artificial reality device based at least in part on the first artificial reality device having a different relative position to the designated artificial reality device compared to a relative position of the second artificial reality device.

Example 6: The computer-implemented method of examples 1-5, where the local data transfer method enabled by the plurality of artificial reality devices being in the shared physical location includes wi-fi data transfer.

Example 7: The computer-implemented method of examples 1-6, where the local data transfer method enabled by the plurality of artificial reality devices being in the shared physical location includes near-field communication.

Example 8: The computer-implemented method of examples 1-7, where the local data transfer method enabled by the plurality of artificial reality devices being in the shared physical location includes light-based data transfer.

Example 9: The computer-implemented method of examples 1-8, where each artificial reality device in the plurality of artificial reality devices is operated by a different user.

Example 10: The computer-implemented method of examples 1-9, where each artificial reality device in the plurality of artificial reality devices is capable of downloading the data.

Example 11: A system for local data transmission may include at least one physical processor and physical memory including computer-executable instructions that, when executed by the physical processor, cause the physical processor to (i) determine that data being requested from a remote server by a plurality of artificial reality devices in a shared physical location includes the same data and, in response to determining that the plurality of artificial reality devices are requesting the same data, (i) prevent downloading of the data from the remote server by a set of artificial reality devices within the plurality that excludes a designated artificial reality device, (ii) download, by the designated artificial reality device, the data from the remote server, and (iii) transmit the data from the designated artificial reality device to the set of artificial reality devices via a local data transfer method enabled by the plurality of artificial reality devices being in the shared physical location.

Example 12: The system of example 11, where the data includes artificial reality environment data.

Example 13: The system of examples 11-12, where he plurality of artificial reality devices includes a plurality of head-mounted displays.

Example 14: The system of examples 11-13, where transmitting the data from the designated artificial reality device to the set of artificial reality devices includes selecting the local data transfer method from a set of available local data transfer methods based at least in part on a position of the designated artificial reality device relative to a position of each artificial reality device in the set of artificial reality devices.

Example 15: The system of examples 11-14, where selecting the local data transfer method from the set of available local data transfer methods includes selecting a first local data transfer method for a first artificial reality device and a second local data transfer method for a second artificial reality device based at least in part on the first artificial reality device having a different relative position to the designated artificial reality device compared to a relative position of the second artificial reality device.

Example 16: The system of examples 11-15, where the local data transfer method enabled by the plurality of artificial reality devices being in the shared physical location includes wi-fi data transfer.

Example 17: The system of examples 11-16, where the local data transfer method enabled by the plurality of artificial reality devices being in the shared physical location includes near-field communication.

Example 18: The system of examples 11-17, where the local data transfer method enabled by the plurality of artificial reality devices being in the shared physical location includes light-based data transfer.

Example 19: The system of examples 11-18, where each artificial reality device in the plurality of artificial reality devices is operated by a different user.

Example 20: A non-transitory computer-readable medium may include one or more computer-readable instructions that, when executed by at least one processor of a computing device, cause the computing device to (i) determine that data being requested from a remote server by a plurality of artificial reality devices in a shared physical location includes the same data and, in response to determining that the plurality of artificial reality devices are requesting the same data, (i) prevent downloading of the data from the remote server by a set of artificial reality devices within the plurality that excludes a designated artificial reality device, (ii) download, by the designated artificial reality device, the data from the remote server, and (iii) transmit the data from the designated artificial reality device to the set of artificial reality devices via a local data transfer method enabled by the plurality of artificial reality devices being in the shared physical location.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data via a data receiver and/or transmitter, output a result of the transformation to transmit the data to one or more additional devices via one or more data transfer technologies, use the result of the transformation to transmit the data, and store the result of the transformation to log the data transmission. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   determining data being requested from a remote server by a plurality of artificial reality devices in a shared physical location comprises a same data; and
   in response to determining that the plurality of artificial reality devices are requesting the same data:
      preventing downloading of the data from the remote server by a set of artificial reality devices within the plurality that excludes a designated artificial reality device;
      downloading, by the designated artificial reality device, the data from the remote server; and
      transmitting the data from the designated artificial reality device to the set of artificial reality devices via a local data transfer method enabled by the plurality of artificial reality devices being in the shared physical location.

2. The computer-implemented method of claim 1, wherein the data comprises artificial reality environment data.

3. The computer-implemented method of claim 1, wherein the plurality of artificial reality devices comprises a plurality of head-mounted displays.

4. The computer-implemented method of claim 1, wherein transmitting the data from the designated artificial reality device to the set of artificial reality devices comprises selecting the local data transfer method from a set of available local data transfer methods based at least in part on a position of the designated artificial reality device relative to a position of each artificial reality device in the set of artificial reality devices.

5. The computer-implemented method of claim 4, wherein selecting the local data transfer method from the set of available local data transfer methods comprises selecting a first local data transfer method for a first artificial reality device and a second local data transfer method for a second artificial reality device based at least in part on the first artificial reality device having a different relative position to the designated artificial reality device compared to a relative position of the second artificial reality device.

6. The computer-implemented method of claim 1, wherein the local data transfer method enabled by the plurality of artificial reality devices being in the shared physical location comprises wi-fi data transfer.

7. The computer-implemented method of claim 1, wherein the local data transfer method enabled by the plurality of artificial reality devices being in the shared physical location comprises near-field communication.

8. The computer-implemented method of claim 1, wherein the local data transfer method enabled by the plurality of artificial reality devices being in the shared physical location comprises light-based data transfer.

9. The computer-implemented method of claim 1, wherein each artificial reality device in the plurality of artificial reality devices is operated by a different user.

10. The computer-implemented method of claim 1, wherein each artificial reality device in the plurality of artificial reality devices is capable of downloading the data.

11. A system comprising:
    at least one physical processor; and
    physical memory comprising computer-executable instructions that, when executed by the physical processor, cause the physical processor to:

determine data being requested from a remote server by a plurality of artificial reality devices in a shared physical location comprises a same data; and in response to determining that the plurality of artificial reality devices are requesting the same data:

prevent downloading of the data from the remote server by a set of artificial reality devices within the plurality that excludes a designated artificial reality device;

download, by the designated artificial reality device, the data from the remote server; and transmit the data from the designated artificial reality device to the set of artificial reality devices via a local data transfer method enabled by the plurality of artificial reality devices being in the shared physical location.

12. The system of claim 11, wherein the data comprises artificial reality environment data.

13. The system of claim 11, wherein the plurality of artificial reality devices comprises a plurality of head-mounted displays.

14. The system of claim 11, wherein transmitting the data from the designated artificial reality device to the set of artificial reality devices comprises selecting the local data transfer method from a set of available local data transfer methods based at least in part on a position of the designated artificial reality device relative to a position of each artificial reality device in the set of artificial reality devices.

15. The system of claim 14, wherein selecting the local data transfer method from the set of available local data transfer methods comprises selecting a first local data transfer method for a first artificial reality device and a second local data transfer method for a second artificial reality device based at least in part on the first artificial reality device having a different relative position to the designated artificial reality device compared to a relative position of the second artificial reality device.

16. The system of claim 11, wherein the local data transfer method enabled by the plurality of artificial reality devices being in the shared physical location comprises wi-fi data transfer.

17. The system of claim 11, wherein the local data transfer method enabled by the plurality of artificial reality devices being in the shared physical location comprises near-field communication.

18. The system of claim 11, wherein the local data transfer method enabled by the plurality of artificial reality devices being in the shared physical location comprises light-based data transfer.

19. The system of claim 11, wherein each artificial reality device in the plurality of artificial reality devices is operated by a different user.

20. A non-transitory computer-readable medium comprising one or more computer-readable instructions that, when executed by at least one processor of a computing device, cause the computing device to:

determine that data being requested from a remote server by a plurality of artificial reality devices in a shared physical location comprises a same data; and in response to determining that the plurality of artificial reality devices are requesting the same data:

prevent downloading of the data from the remote server by a set of artificial reality devices within the plurality that excludes a designated artificial reality device;

download, by the designated artificial reality device, the data from the remote server; and transmit the data from the designated artificial reality device to the set of artificial reality devices via a local data transfer method enabled by the plurality of artificial reality devices being in the shared physical location.

* * * * *